United States Patent Office 3,554,631
Patented Jan. 12, 1971

3,554,631
GROOVED OBJECT SLIDE FOR INTERFERENCE MICROSCOPE
Hermann Beyer and Gunter Schoppe, Jena, Germany, assignors to VEB Carl Zeiss Jena, Jena, Germany
Filed Jan. 22, 1968, Ser. No. 703,511
Int. Cl. G02b 21/34; G01n 21/46
U.S. Cl. 350—94                                  5 Claims

ABSTRACT OF THE DISCLOSURE

An object slide, particularly for interference microscopes, is provided with a groove. The groove is broader at the surface of the slide than it is at its bottom. A mark on the surface of the slide is in close vicinity to the groove.

---

Figure 1:
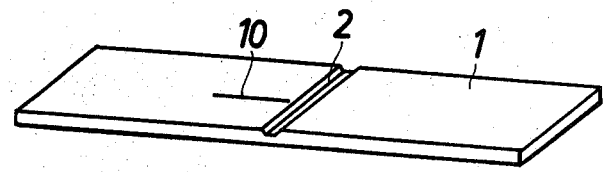

This invention relates to object slides, particularly for use with interference microscopes for determining the refractive indices of liquids and particulate matter.

Object slides are known into which ball segments are ground for reception of the media to be analyzed.

Such object slides are however disadvantageous in that their use together with powerful microscope objectives for refractometry considerably restricts the accuracy of measurement, and that the measurement of the refractive index and the analysis of this measurement are rather complicated and inaccurate because of the necessity of counting the interference rings appearing in the ball segment, which are very differently spaced from one another, and because fractions of an interference-fringe spacing have to be measured by means of a compensator introduced into the ray path. As a consequence of these disadvantages there is a considerable amount of instability in the measured results, since the geometrical nature of a ball segment causes the disappearance of part of the annular interference fringes to be compensated, which towards the center degenerate to a spot.

The present invention aims at obviating the foregoing disadvantages by means of an object slide which considerably simplifies and improves the measurement of the refractive indices of media and the analysis of the measured results.

To this end, the present invention consists in an object slide for microscopes having a groove for the reception of the specimen to be examined.

The groove is rectilinear and of a depth corresponding to the measuring accuracy required and/or the breadth of the groove at the surface of the object slide is smaller than the diameter of the object-field of the microscope with which it is to be used but greater than the breadth of the bottom of the groove.

According to a feature of the invention, the groove is of trapezoidal cross section.

According to another feature of the invention the groove is of triangular cross section.

According to still another feature of the invention the profile lines of said side faces of the groove are curved.

The cross section of the groove is so proportioned to the resolving power of the objective used that the interference fringes transverse to the groove and visible in the interference microscope can be observed singly over the entire breadth of the groove and are approximately equal distances apart at the bottom of the groove and remain fully visible throughout the measuring process, the greatest admissible breadth of the groove being a function of the most powerful microscope objective used. To obtain great measuring accuracy, the breadth of the groove at the surface of the slide is advantageously smaller than the diameter of the object field and, in interference microscopes operating on the shearing principle, smaller than half that diameter. The maximum tangent of the profile of the side faces of the groove which still safely admits well-defined coordination of the transverse interference fringes in the groove to the fringes in the surrounding field, so that the individual fringes are everywhere resolved, corresponds to the relation $$S = \frac{1}{\Delta n} \cdot \sqrt{A^2 - \left(\frac{M \cdot z \cdot \lambda}{F}\right)^2}$$

wherein $\Delta n$ is the difference of the refractive index of the object slide and that of the embedded specimen to be measured, F is the diameter of the object-field diaphragm in millimeters, A is the aperture of the microscope objective, M is the scale number of the microscope objective, z is the number of interference fringes in the field of view, and $\lambda$ is the wave length of light. In a preferred embodiment, the tangent of the profile lines of the side faces and the surface of the object slide include an angle smaller than or equal to 45°.

The object slide according to the invention presents the advantage that it permits accurate and simple measurement of refractive indices in both monochromatic and mixed light even if very powerful microscope objectives are used, thus avoiding the complications which in the case of great path differences accrue in the use of mixed light from the coordination of the interference fringes to the zero fringes. Path differences which are integral multiples of $\lambda$ need accordingly be counted only with the aid of interference fringes at approximately equal distances from each other. Fractions b of an interference-fringe interval a and, accordingly, fractions of $\lambda$ can be estimated or measured. The fraction b represents the interference-fringe displacement caused by the groove and the test medium therein. The middle of an interference fringe remains fully visible for focusing. The refractive index of the specimen material $n_2$ can be calculated from the measured path difference $\Delta$, which in its turn is calculated by means of the well-known equation $$\Delta = \frac{b}{a} \lambda$$

the depth d of the groove and the refractive index of the object slide n is calculated according to the equation $$n_2 = n_1 + \frac{\Delta}{d}$$

Figure 2:
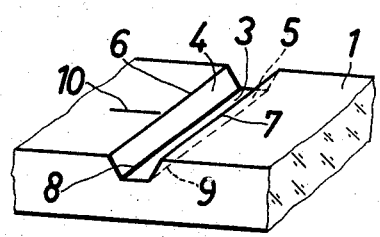
Figure 3:
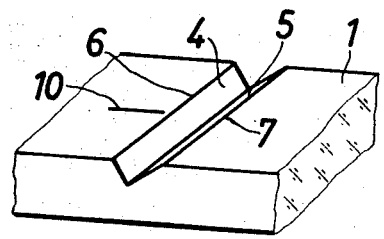
Figure 4:
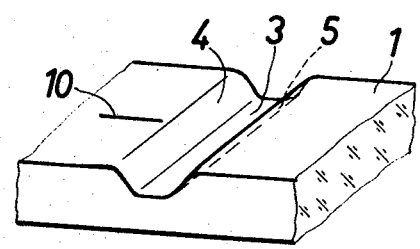

In order that the invention may be more clearly understood, reference is made to the accompanying drawings which illustrate diagrammatically and by way of example one embodiment of the object slide of the invention and in which:

FIG. 1 is a perspective view of the object slide;
FIG. 2 shows on a larger scale the trapezoidal groove in this slide;
FIG. 3 shows on a larger scale the triangular groove in said slide; and
FIG. 4 shows an object slide having a groove with curved side faces.

In the drawings, an object slide 1 contains a rectilinear trapezoidal groove 2 having a bottom 3 and lateral faces 4 and 5. The breadth of the groove 2 at the surface of the object slide 1 is for example <100 µm., and the depth of the groove 2 is in the order of 10 µm. A trapezoidal profile of the groove 2 has proved to be particularly advantageous. The profile may be however of any other shape, provided that the foregoing conditions are fulfilled as regards breadth of the groove 2 at the surface of the object slide and maximum tangent of the side faces 4 and 5. The faces 4 and 5 may for example be curved. The edges 6 and 7 formed by the upper face of the object slide 1 and the side faces 4 and 5, and the edges 8 and 9 formed by the bottom 3 and the side faces 4 and 5, may be rounded off. For finding the interference-fringe displacement with great accuracy, it is of course necessary for a sufficiently large part of the bottom 3 of the groove to be plane and smooth.

For the measurements always to take place at the same part of the groove 2, and for preventing faulty measurement due to possible differences in the depth in the groove 2, it is advantageous to provide the object slide 1 with a mark 10 in close vicinity to the groove 2.

We claim:

1. In combination with an interference microscope for determining refractive indices of liquids and particulate matter, an object slide having defined in one of its surfaces a substantially rectilinear groove for receiving the specimen, the groove being bounded by two side faces and a planar and smooth bottom and having a greater breadth at said surface of the object slide that at the bottom of the object slide, the breadth of the groove at said surface being smaller than the diameter of the object field of the microscope and less than 100 microns, the depth of the groove being of the order of 10 microns, the angle included between a tangent taken at any point of the profile line of each of the side faces and said surface not exceeding 45° and the maximum tangent S complying with the equation $$S = \frac{1}{\Delta n} \sqrt{A^2 - \left(\frac{Mz\lambda}{F}\right)^2}$$

wherein $\Delta n$ is the difference between the refractive index of the slide and that of the specimen, F is the diameter of the object field diaphragm in millimeters, A is the aperture of the microscope objective, M is the scale number of the microscope objective, z is the number of interference fringes in the field of view and $\lambda$ is the wave length of the light employed, whereby the refractive index $n_2$ of the specimen corresponds to the equation $$n_2 = n_1 + \frac{\Delta}{d}$$

wherein $n_1$ is the refractive index of the slide, $d$ is the depth of the groove and $\Delta$ is the measured path difference.

2. A combination according to claim 1, wherein said groove is of trapezoidal cross section.

3. A combination according to claim 1, wherein said groove is of triangular cross section.

4. A combination according to claim 1, wherein the profile lines of said side faces are curved.

5. A combination according to claim 1, further comprising a mark on said surface in close proximity to said groove.

References Cited

UNITED STATES PATENTS

| | | | |
|---|---|---|---|
| 1,824,097 | 9/1931 | Ott | 350—94 |
| 3,432,275 | 3/1969 | Unger | 350—95X |
| 977,842 | 12/1910 | Sauver | 350—92 |
| 1,205,838 | 11/1916 | Baldwin | 88—14SH |
| 2,041,290 | 5/1936 | Jackson | 88—14SH |
| 2,258,073 | 10/1941 | Stevens | 88—14SH |
| 2,655,077 | 10/1953 | Bennett | 350—13 |

FOREIGN PATENTS

| | | | |
|---|---|---|---|
| 669,479 | 4/1952 | Great Britain | 350—12 |
| 982,400 | 2/1965 | Great Britain | 350—12 |

DAVID H. RUBIN, Primary Examiner

U.S. Cl. X.R.

350—95, 12; 356—107, 128